United States Patent
Nagafuchi et al.

(10) Patent No.: US 12,528,199 B2
(45) Date of Patent: Jan. 20, 2026

(54) TRANSFER SYSTEM AND TRANSFER METHOD

(71) Applicant: KABUSHIKI KAISHA YASKAWA DENKI, Fukuoka (JP)

(72) Inventors: Koji Nagafuchi, Fukuoka (JP); Keisuke Higashi, Fukuoka (JP); Takashi Minami, Fukuoka (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 192 days.

(21) Appl. No.: 18/371,784

(22) Filed: Sep. 22, 2023

(65) Prior Publication Data

US 2024/0109200 A1    Apr. 4, 2024

(30) Foreign Application Priority Data

Sep. 30, 2022    (JP) ................. 2022-158431

(51) Int. Cl.
*B25J 11/00*    (2006.01)
*B25J 9/04*    (2006.01)
*B25J 9/16*    (2006.01)

(52) U.S. Cl.
CPC ......... *B25J 11/0095* (2013.01); *B25J 9/1687* (2013.01); *B25J 9/044* (2013.01)

(58) Field of Classification Search
CPC ...... B25J 11/0095; B25J 9/1687; B25J 9/044; B25J 9/1612; B25J 15/0014; B25J 19/021;
(Continued)

(56) References Cited

U.S. PATENT DOCUMENTS 5,565,034 A * 10/1996 Nanbu .............. H01L 21/67265
                                                              118/712
11,817,336 B2 * 11/2023 Hung ................ H01L 21/67253
(Continued)

FOREIGN PATENT DOCUMENTS

CN    116190278 B  *  7/2023
CN    118235619 A  *  6/2024  ............. A01D 46/30
(Continued)

OTHER PUBLICATIONS

WO-2021206133-A1 translation (Year: 2021).*
(Continued)

*Primary Examiner* — Kyle T Johnson
(74) *Attorney, Agent, or Firm* — Venjuris, P.C.

(57) ABSTRACT

A transfer system includes a robot that loads and unloads a substrate to and from a cassette that accommodates a plurality of substrates in multiple stages; and a controller configured to control an operation of the robot. The robot includes: a hand that transfers the substrate, a horizontal movement mechanism that moves the hand in a width direction of the cassette in a front side of the cassette, and a lift mechanism that moves up and down the hand in the front side of the cassette. The hand includes a reflective sensor on a distal end side thereof facing the cassette to detect an object in the cassette. The controller operates the horizontal movement mechanism causing the reflective sensor to perform a horizontal scanning such that the reflective sensor facing the substrate scans in the width direction of the substrate accommodated in the cassette.

15 Claims, 12 Drawing Sheets

(58) Field of Classification Search
CPC ........ B25J 9/042; B25J 9/1602; B25J 9/1664;
B25J 9/04; B25J 13/08; B25J 19/02;
G05B 2219/40301; G05B 2219/40613;
H01L 21/67259; H01L 21/68707; H01L
21/67265; H01L 21/67288; H01L
21/67742; H01L 21/67766; H01L
21/67242; H01L 21/67778
See application file for complete search history.

(56) References Cited

U.S. PATENT DOCUMENTS

| | | | | |
|---|---|---|---|---|
| 2001/0030101 | A1* | 10/2001 | Berner | H01L 21/67742 29/25.01 |
| 2005/0036863 | A1* | 2/2005 | Wakizako | H01L 21/67265 414/936 |
| 2005/0110287 | A1* | 5/2005 | Florindi | H01L 21/68707 294/2 |
| 2013/0180953 | A1* | 7/2013 | Iwai | B05C 13/00 118/712 |
| 2016/0111312 | A1* | 4/2016 | Yoshida | H01L 21/681 294/213 |
| 2016/0318182 | A1* | 11/2016 | Nakaya | B25J 9/1697 |
| 2017/0038306 | A1* | 2/2017 | Wang | G01N 21/88 |
| 2018/0029237 | A1* | 2/2018 | Sugawara | B25J 9/1697 |
| 2018/0254210 | A1* | 9/2018 | Fukushima | H01L 21/68707 |
| 2019/0382213 | A1* | 12/2019 | Hwang | H01L 21/67294 |
| 2020/0206917 | A1* | 7/2020 | Yoshida | H01L 21/67766 |
| 2021/0265188 | A1* | 8/2021 | Moura | H01L 21/67248 |
| 2024/0109197 | A1* | 4/2024 | Taruno | B25J 9/1638 |
| 2024/0109200 | A1* | 4/2024 | Nagafuchi | B25J 9/042 |

FOREIGN PATENT DOCUMENTS

| | | | | |
|---|---|---|---|---|
| JP | 2004214462 A | * | 7/2004 | ....... H01L 21/67265 |
| JP | 2007-234936 A | | 9/2007 | |
| JP | 2021-167044 A | | 10/2021 | |
| KR | 101810172 B1 | * | 12/2017 | |
| WO | WO-2010119846 A1 | * | 10/2010 | ....... H01L 21/67259 |
| WO | WO-2021206133 A1 | * | 10/2021 | .............. B25J 13/08 |

OTHER PUBLICATIONS

CN-116190278-B translation (Year: 2023).*
CN-118235619-A translation (Year: 2024).*
JP-2004214462-A translation (Year: 2004).*
KR-101810172-B1 translation (Year: 2017).*
WO-2010119846-A1 translation (Year: 2010).*

* cited by examiner

TRANSFER SYSTEM AND TRANSFER METHOD

CROSS-REFERENCE TO RELATED APPLICATIONS

This application is based on and claims priority from Japanese Patent Application No. 2022-158431 filed on Sep. 30, 2022 with the Japan Patent Office, the disclosure of which is incorporated herein in its entirety by reference.

TECHNICAL FIELD

The present disclosure relates to a transfer system and a transfer method.

BACKGROUND

In the related art, a transfer system has been known, which uses a robot with a hand to transfer substrates such as wafers and panels to and from a cassette that holds the substrates.

For example, a technique has been proposed, which detects the possibility of contact between a robot and a wafer accommodated in a cassette by a wafer transfer arm or a cassette sensor (see, e.g., Japanese Patent Laid-Open Publication No. 2007-234936).

SUMMARY

In the related art described above, when the substrates accommodated in the cassette are significantly deflected (bent or warped), there is a possibility that the accommodated substrates come into contact with the robot or new substrates to be loaded.

An aspect of an embodiment is to provide a transfer system and a transfer method capable of preventing substrates from being damaged due to a contact even when the substrates are significantly deflected.

According to an aspect of an embodiment, a transfer system includes a robot that loads and unloads a substrate to and from a cassette that accommodates a plurality of substrates in multiple stages, and a controller that controls an operation of the robot. The robot includes a hand that transfers the substrate, a horizontal movement mechanism that moves the hand in a width direction in a front side of the cassette, and a lift mechanism that moves up and down the hand. The hand includes a reflective sensor that detects an object on a distal end side facing the cassette. The controller operates the horizontal movement mechanism such that the reflective sensor facing the substrate scans in the width direction of the substrate accommodated in the cassette, thereby causing the reflective sensor to perform horizontal scanning.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawings, and claims are not meant to be limiting. Other embodiments may be utilized, and other changes may be made without departing from the spirit or scope of the subject matter presented here.

Hereinafter, a transfer robot and a robot system of the present disclosure will be described in detail with reference to the drawings. The present disclosure is not limited to the embodiments described herein below.

Further, in the embodiments described herein below, expressions such as "parallel," "front," "parallel," and "intermediate" may be used, but these conditions may not be strictly satisfied. That is, the expressions may allow deviations in, for example, manufacturing accuracy, installation accuracy, processing accuracy, and detection accuracy.

(Outline of Transfer System)

Figure 1:
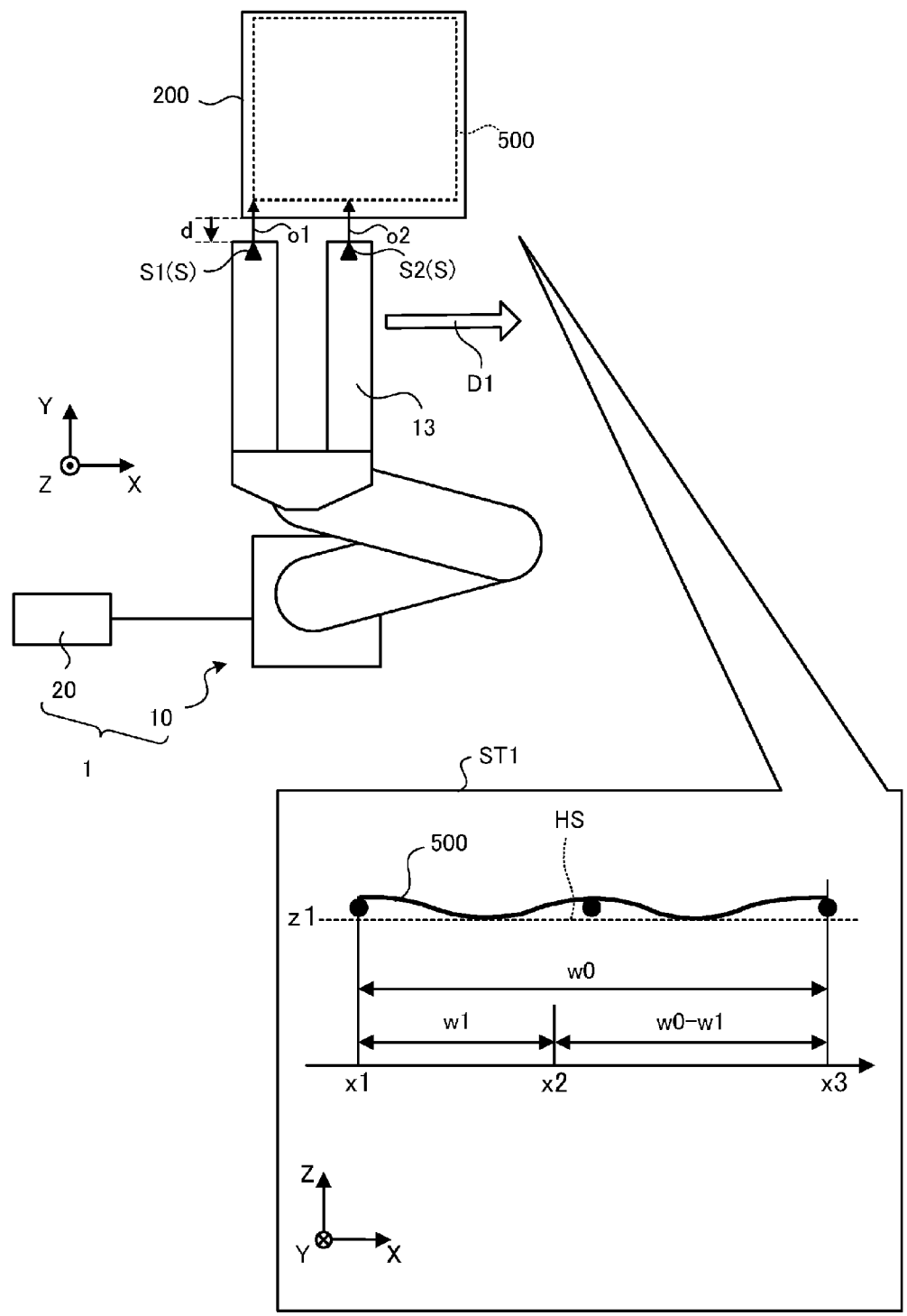
FIG. 1 is a schematic top view illustrating the outline of a transfer system.

First, an outline of a transfer system 1 according to an embodiment will be described with reference to FIG. 1. FIG. 1 is a schematic top view illustrating the outline of the transfer system 1.

To facilitate the understanding of the descriptions, FIG. 1 illustrates a three-dimensional orthogonal coordinate system with a Z axis having the vertical upward direction as a positive direction, an X axis parallel to a width direction along the front side of a cassette 200 on which a substrate 500 is placed, and an Y axis parallel to a depth direction of the cassette 500. Such an orthogonal coordinate system may also be illustrated in other drawings used in the following descriptions.

Here, the front side of the cassette 200 refers to a side of the cassette 200 having an opening into which the hand 13 is capable of being inserted. Further, the cassette 200 has a plurality of support portions (not illustrated) that extend in the insertion direction (Y-axis direction) of the hand 13 and support the substrate 500 placed from above, from below. A configuration example of the cassette 200 will be described later with reference to FIGS. 3A and 3B.

Further, FIG. 1 illustrates a front view ST1 of the substrate 500 placed on the cassette 200 as seen from the front side (Y-axis negative direction side). The front view ST1 schematically depicts that the substrate 500 is deflected, by drawing the substrate 500 in a wavy manner. The substrate 500 may be illustrated in the same manner in drawings other than FIG. 1 that will be described later. In addition, the black circles in the front view ST1 correspond to the above-described support portions that support the substrate 500 from below.

Further, FIG. 1 illustrates the cassette 200 that accommodates substrates 500 in multiple stages as a placement location for the substrates 500. However, the placement location for the substrates 500 may be an aligner for aligning the orientation of the substrates 500 or a processing apparatus for processing the substrates 500 as long as the substrates 500 are accommodated in multiple stages. An example of arrangement of the aligner and the processing apparatus will be described later with reference to FIG. 7. Further, in this embodiment, the substrate 500 is a panel such as a substrate of resin material (e.g., glass epoxy) or a glass substrate having a rectangular outer shape, but the substrate 500 may be a wafer having a circular outer shape or a thin plate of any shape and any material.

As illustrated in FIG. 1, the transfer system 1 includes a robot 10 and a controller 20 that controls the operation of the robot 10. The robot 10 includes a hand 13 that transfers the substrate 500, a horizontal movement mechanism that moves the hand 13 in a width direction (X-axis direction) in the front side of the cassette 200, and a lift mechanism that moves up and down the hand 13.

Further, the hand 13 includes a sensor S that detects an object such as the cassette 200 and the substrate 500 in the cassette 200. The sensor S is, for example, a reflective laser sensor. The sensor S emits lights of and o2 forward at a predetermined detectable distance d from the front side of the cassette 200 illustrated in FIG. 1. Further, the sensor S detects the reflected light that the lights o1 and o2 return after being reflected by the cassette 200 and the substrate 500 in the cassette 200, thereby detecting the presence or absence and the position of the object.

Although FIG. 1 illustrates a case where two sensors S1 and S2 are provided on the distal end side of the hand 13 branched into two, the number of sensors S may be one. Further, when the hand 13 is branched into three or more, the sensor S may be provided on the distal end side of each of the branched portions. That is, the hand 13 may be provided with the same number of sensors S as the branched portions (hereinafter, referred to as "extending portions") of the hand 13.

The controller 20 stores placement information including a "placement height (Z coordinate)" at a placement position of the substrate 500 in the XY coordinates. Further, in order to load or unload the substrate 500 at the placement height, the controller 20 performs a mapping process to determine, based on the scanning result of the sensor S, whether the hand 13 is insertable into the cassette 200 without bringing the hand 13 or the substrate 500 held by the hand 13 into contact with other substrates 500 in the cassette 200.

At this time, the controller 20 operates the horizontal movement mechanism such that the sensor S facing the substrate 500 scans in the width direction of the substrate 500 accommodated in the cassette 200, thereby causing the sensor S to perform horizontal scanning.

Further, regarding the horizontal scanning, the controller 20 sets a position where the sensor S1 faces one end of the substrate 500 and the sensor S2 faces a range where the substrate 500 exists (e.g., a position between one end of the substrate and the other end of the substrate), as a start position. Then, the controller 20 performs the horizontal scanning such that the hand 13 moves from the start position to an end position where the sensor S1 reaches a position of the sensor S2 at the start position and the sensor S2 reaches the other end of the substrate 500 (see arrow D1 in FIG. 1).

Specifically, as illustrated in the front view ST1 of FIG. 1, the controller 20 calculates a planned insertion height z1 of the hand 13 with respect to the cassette 200 when the substrate 500 is loaded or unloaded.

Upon the loading, the controller 20 loads the substrates 500 sequentially from the upper stage to the lower stage in the cassette 200. In the loading, the controller 20 calculates the planned insertion height z1 for loading to the second stage and subsequent stages from the top, based on the above-described placement height, the thickness of the hand 13, and the thickness of the substrate 500 held by the hand 13.

Meanwhile, upon the unloading, the controller 20 unloads the substrates 500 sequentially from the lowest stage toward the upper stage in the cassette 200. In the unloading, the controller 20 calculates the planned insertion height z1 for unloading from the lowest stage, based on a lowest position 1p, which corresponds to the height position of the bottom side of the cassette 200, a pitch P between the respective stages (both see, e.g., FIG. 3A), and the thickness of the hand 13. The controller 20 acquires the lowest position 1p by a first mapping process when the substrate 500 is unloaded in the unloading process. The first mapping process upon the unloading of the substrate 500 will be described later with reference to FIG. 5.

Then, the controller 20 controls the operation of the robot 10 to bring the hand 13 closer to a detectable distance d of the sensor S and align the hand 13 with the planned insertion height z1. Further, at this time, the controller 20 aligns the hand 13 such that the sensor S1 is positioned at a position x1, which is a position facing one end of the substrate 500. As a result, the sensor S2, which is spaced apart from the sensor S1 by a separation distance w1, is positioned at a position x2.

Then, using the positions x1 and x2, the controller 20 moves the hand 13 until the sensor S1 reaches the position x2 and the sensor S2 reaches a position x3, which is a position facing the other end of the substrate 500, and causes the sensor S to perform the horizontal scanning along a locus HS. Assuming that the width from one end to the other end of the substrate 500 along the X-axis direction is a width w0, the controller 20 moves the hand 13 in a horizontal movement amount as calculated by "width w0−separation distance w1."

Then, based on the scanning result of the sensor S, the controller 20 determines that the hand 13 is insertable into the cassette 200 at the planned insertion height z1 when the substrate 500 is not detected on the locus HS. In this case, the controller 20 then loads and unloads the substrate 500 as planned.

Meanwhile, based on the scanning result of the sensor S, the controller 20 determines that the hand 13 is not insertable into the cassette 200 at the planned insertion height z1 when the substrate 500 is detected on the locus HS. In this case, for example, the controller 20 outputs an error, or cancels the planned loading/unloading of the substrate 500.

The mapping process upon the loading of the substrate 500 that causes the sensor S to perform the horizontal scanning along the locus HS in the loading process of the substrate 500 will be described later with reference to FIG. 4. Further, the mapping process upon the unloading of the substrate 500 that causes the sensor S to perform the horizontal scanning along the locus HS in the unloading process of the substrate 500 will be described later with reference to FIG. 6.

When it is determined that the hand 13 is not insertable into the cassette 200 at the time of the loading, the controller 20 may lower the stage into which the substrate 500 was to be loaded, by one or more stages, and load the substrate 500 into a vacant stage.

Further, when the substrate 500 is unloaded from a stage above the lowest stage at the time of the unloading, the controller 20 repeats inserting the hand 13 from a position at least one stage below an unloading target stage, thereby making it possible to unload all the substrates 500 without bringing the hand 13 into contact with the substrates 500.

Therefore, according to the transfer system 1 illustrated in FIG. 1, even when the substrate 500 is deflected, it is possible to prevent damage to the substrate 500 due to contact between the substrate 500 that has been loaded and the hand 13 or the substrate 500 held by the hand 13.

Although FIG. 1 illustrates the case where the scanning width of the sensor S is from one end to the other end of the substrate 500 in the width direction of the cassette 200, the scanning width of the sensor S is not limited thereto. A modification of the scanning width of the sensor S will be described later with reference to FIG. 12.

(Configuration Example of Robot)

Figure 2:
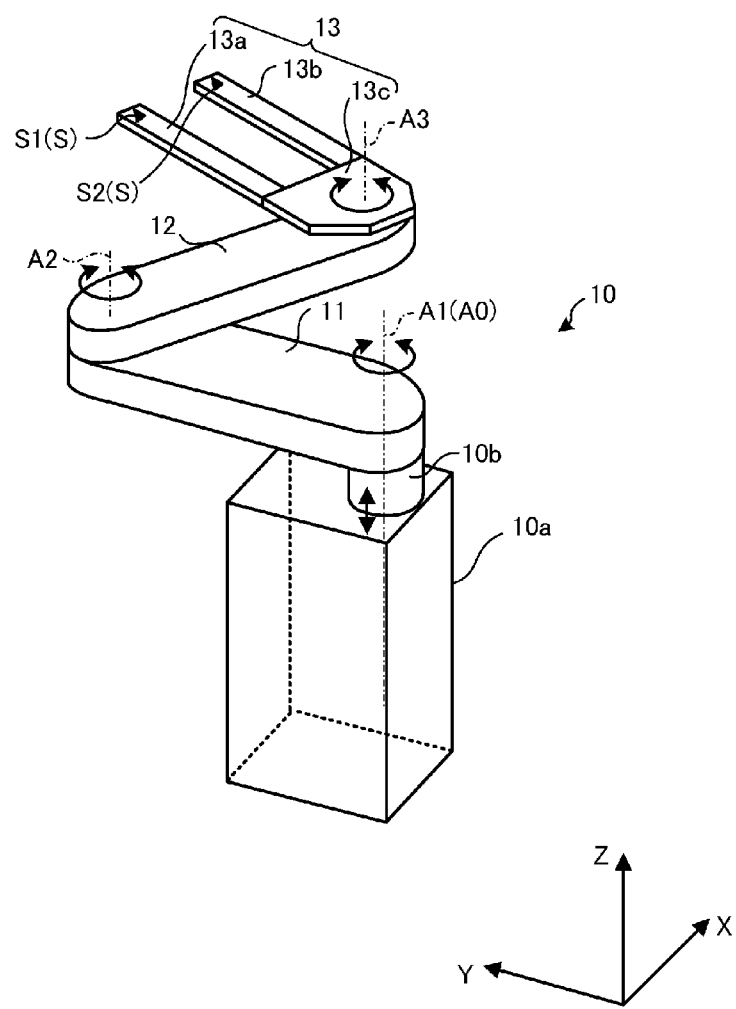
FIG. 2 is a perspective view illustrating a robot.

Next, a configuration example of the robot 10 illustrated in FIG. 1 will be described with reference to FIG. 2. FIG. 2 is a perspective view of the robot 10. FIG. 2 corresponds to a perspective view of the robot 10 as viewed obliquely from above.

As illustrated in FIG. 2, the robot 10 is, for example, a horizontally articulated robot having a horizontally articulated SCARA arm and a lift mechanism. The robot 10 includes a body portion 10a, a lift portion 10b, a first arm 11, a second arm 12, and a hand 13. The body portion 10a is fixed to, for example, a bottom surface of the transfer chamber, and incorporates a lift mechanism for moving up and down the lift portion 10b.

The lift portion 10b supports a proximal end side of the first arm 11 so as to be rotatable around a first axis A1, and moves up along a lift axis A0. The lift portion 10b itself may be rotated around the first axis A1. Alternatively, the first axis A1 may be positioned closer to the Y-axis negative direction on the upper surface of the lift portion 10b. The first arm 11 may be made longer by positioning the first axis A1 closer to the Y-axis negative direction in the same drawing.

The first arm 11 supports a proximal end side of the second arm 12 on the distal end side so as to be rotatable around the second axis A2. The second arm 12 supports a proximal end side of the hand 13 on the distal end side so as to be rotatable around the third axis A3.

Thus, the robot 10 is a horizontally articulated robot including three links of the first arm 11, the second arm 12, and the hand 13. Further, since the robot 10 has a lift mechanism as described above, the robot 10 may access each of the substrates 500 accommodated in multiple stages in the cassette 200 and acquire the presence or absence of each of the accommodated substrates 500 by the operation of moving down the hand 13.

The hand 13 includes a first extending portion 13a, a second extending portion 13b, and a base portion 13c. The first extending portion 13a and the second extending portion 13b are branched from the base portion 13c and extend to face each other with a gap therebetween. Further, a sensor S1 and a sensor S2 are provided on the distal end sides of the upper surfaces of the first extending portion 13a and the second extending portion 13b, respectively.

The substrate 500 illustrated in FIG. 1 is supported from below by the first extending portion 13a and the second extending portion 13b. The first extending portion 13a and the second extending portion 13b have a holding mechanism (not illustrated) that employs, for example, a contact adsorption method, a non-contact adsorption method, or a grasping method, and hold and support the substrate 500 by the holding mechanism.

(Configuration Example of Cassette)

Figure 3A:
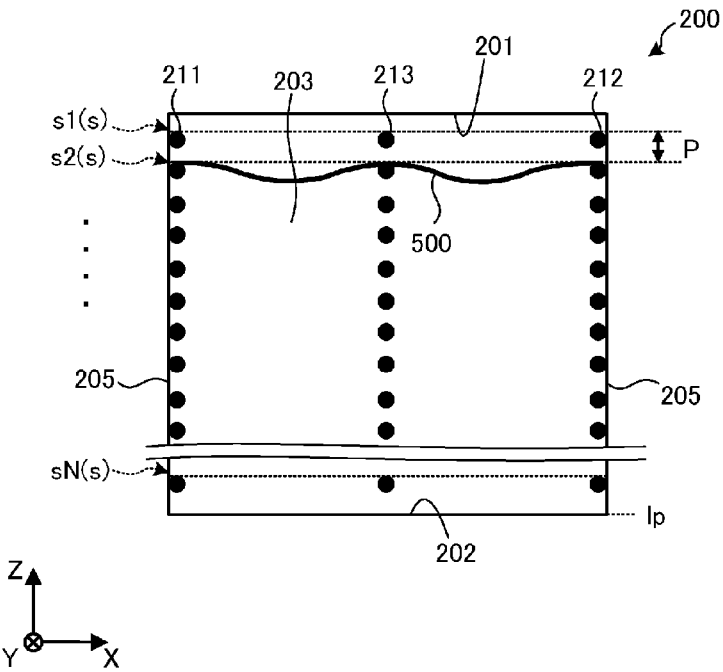
FIG. 3A is a schematic front view illustrating a cassette.
Figure 3B:
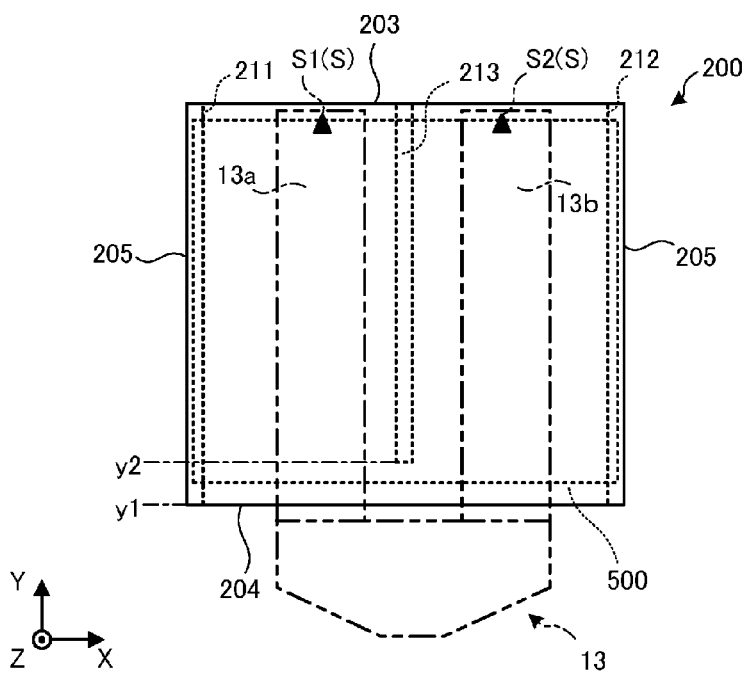
FIG. 3B is a schematic top view illustrating the cassette.

Next, the cassette 200 illustrated in FIG. 1 will be described with reference to FIGS. 3A and 3B. FIG. 3A is a schematic front view of the cassette 200. Further, FIG. 3B is a schematic top view of the cassette 200. In FIG. 3B, the hand 13 at a delivery position of the substrate 500 in the cassette 200 is indicated by a two-dot chain line.

As illustrated in FIG. 3A, the front side of the cassette 200 is open, and N-stage slots (N is a natural number greater than or equal to 2) are provided between a top surface 201 and a bottom surface 202 inside the cassette 200, and each slot may accommodate a substrate 500. Each slot is provided with a first support portion 211, a second support portion 212, and a third support portion 213 extending in a direction along the depth of the cassette 200 (Y-axis direction). The first support portion 211, the second support portion 212, and the third support portion 213 support the substrate 500 placed by the hand 13 from below.

Here, each slot supports the substrate 500 at a placement height s. When distinguishing the placement height of each stage, the height of the first stage is expressed as a placement height s1, the height of the second stage is expressed as a placement height s2, and the height of the Nth stage is expressed as a placement height (sN). In addition, it is assumed that a pitch P between slots is equal.

The first support portion 211 and the second support portion 212 are provided on the lateral side 205 inside the cassette 200. Further, the third support portion 213 is provided at an intermediate position between the first support portion 211 and the second support portion 212 in the width direction (X-axis direction) of the cassette 200. That is, the cassette 200 supports the substrate 500 at three points when viewed from the front side. Although FIG. 3A illustrates a case where there is one third support portion 213, for example, two or more third support portions 213 may be provided such that the intervals between the supports are equal.

Here, as illustrated in FIG. 3B, the third support portion 213 is a rod-shaped (bar-shaped) member extending from a rear side 203 of the cassette 200 toward the front side 204 of the cassette 200, and its front end y2 is closer to the rear side 203 of the cassette 200 than front ends y1 of the support portion 211 and the second support portion 212. That is, the extension length of the third support portion 213 in the depth direction (Y-axis direction) is shorter than the extension lengths of the first support portion 211 and the second support portion 212.

As described above, when the front end of the third support portion 213 is short, the front side of the substrate 500 supported by the third support portion 213 may droop forward, but the sensor S detects deflection of the substrate 500 including the forward drooping.

Further, as illustrated in FIG. 3B, the hand 13 is provided such that the first extending portion 13a is inserted between the first support portion 211 and the third support portion 213 of the cassette 200, and the second extending portion 13b is inserted between the second support portion 212 and the third support portion 213. As described above, when two or more third support portions 213 are provided, the hand 13 may be provided with a number of extending portions that may be inserted between the respective support portions.

As described above, the cassette 200 includes the first support portion 211 and the second support portion 212 that support both ends of the substrate 500, respectively, when viewed from the front side 204 of the cassette 200. Further, the cassette 200 includes the third support portion 213 that supports the substrate 500 at an intermediate position between the first support portion 211 and the second support portion 212.

Further, the hand 13 includes at least a first extending portion 13a that is insertable between the first support portion 211 and the third support portion 213, and a second extending portion 13b that is insertable between the second support portion 212 and the third support portion 213. The sensors S (sensor S1 and sensor S2) are provided on the distal end sides of the first extending portion 13a and the second extending portion 13b of the hand 13, respectively.

(Explanation of Mapping Process Upon Loading)

Next, horizontal scanning during loading of the substrate 500 will be described with reference to FIG. 4. FIG. 4 is an explanatory diagram of a mapping process when the substrate 500 is loaded. FIG. 4 illustrates three phases (phase S41, phase S42, and phase S43) of the process flow from loading a substrate 500 into the first (top) slot of the cassette 200 to performing horizontal scanning prior to loading a new substrate 500 into the second slot.

Figure 4:
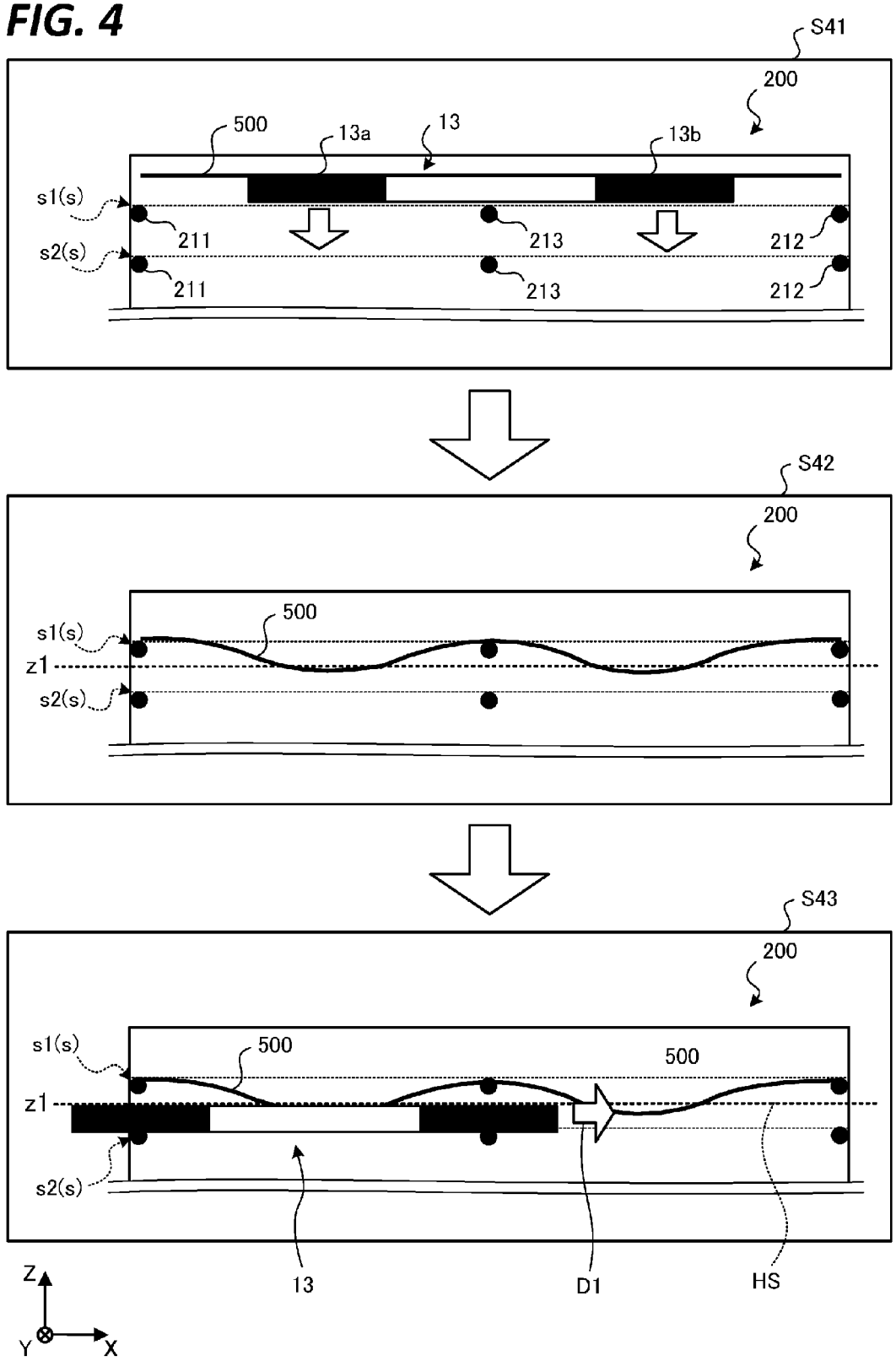
FIG. 4 is an explanatory diagram of a mapping process when a substrate is loaded.

As illustrated in phase S41 in FIG. 4, in order to place the substrate 500 into the first-stage slot, which is at the placement height s1, the controller 20 (see, e.g., FIG. 1) first advances the hand holding the substrate 500 into the cassette 200 at a height higher than the placement height s1. Then, the controller 20 moves down the hand 13 to place the substrate 500 in the first-stage slot having the placement height s1, and then removes the hand 13 from the cassette 200.

Then, as illustrated in phase S42, the substrate 500 is deformed while being supported by the first support portion 211, the second support portion 212, and the third support portion 213. Specifically, the substrate 500 is deflected and deformed due to its own weight, for example, between the first support portion 211 and the third support portion 213 and between the second support portion 212 and the third support portion 213.

Meanwhile, the controller 20 calculates a planned insertion height z1 for the second-stage slot in order to load the new substrate 500 into the second-stage slot having the placement height s2. At this time, the controller 20 calculates the planned insertion height z1 based on the previously stored placement height s2, the thickness of the hand 13, and the thickness of the substrate 500 held by the hand 13. The controller 20 may calculate the planned insertion height z1 by further taking into account the deflection amount of the substrate 500 held by the hand 13.

Then, as illustrated in phase S43, the controller 20 controls the operation of the robot 10 to bring the hand 13 closer to the above-described detectable distance d of the sensor S and align the hand 13 with the planned insertion height z1 calculated in phase S42.

Then, the controller 20 horizontally moves the hand 13 (see arrow D1 in FIG. 4) and causes the sensor S to perform the horizontal scanning along the locus HS.

Then, based on the scanning result of the sensor S, the controller 20 determines that the hand 13 is insertable into the cassette 200 at the planned insertion height z1 when no substrate 500 at the placement height s1 is detected on the locus HS.

Meanwhile, based on the scanning result of the sensor S, the controller 20 determines that the hand 13 is not insertable into the cassette 200 at the planned insertion height z1 when a substrate 500 at the placement height s1 is detected on the locus HS.

In phase S43 of FIG. 4, the substrate 500 held by the hand 13 is not illustrated for convenience of explanation. However, the phase S43 may be executed while the hand 13 holds a new substrate 500 to be loaded into the slot at the placement height s2.

Further, phase S43 may also be executed while the hand 13 does not hold a new substrate 500. In this case, after placing the substrate 500 in the first-stage slot having the placement height s1 and removing the hand 13 from the cassette 200, the controller 20 may cause the sensor S2 to perform the horizontal scanning at the planned insertion height z1 at the placement height s2 before acquiring another substrate 500. At this time, the horizontal scanning may be performed after a waiting period until the deformation of the substrate 500 in phase S42 stabilizes (the substrate 500 is adapted into the slot at the placement height s1).

(Explanation of First Mapping Process Upon Unloading)

Figure 5:
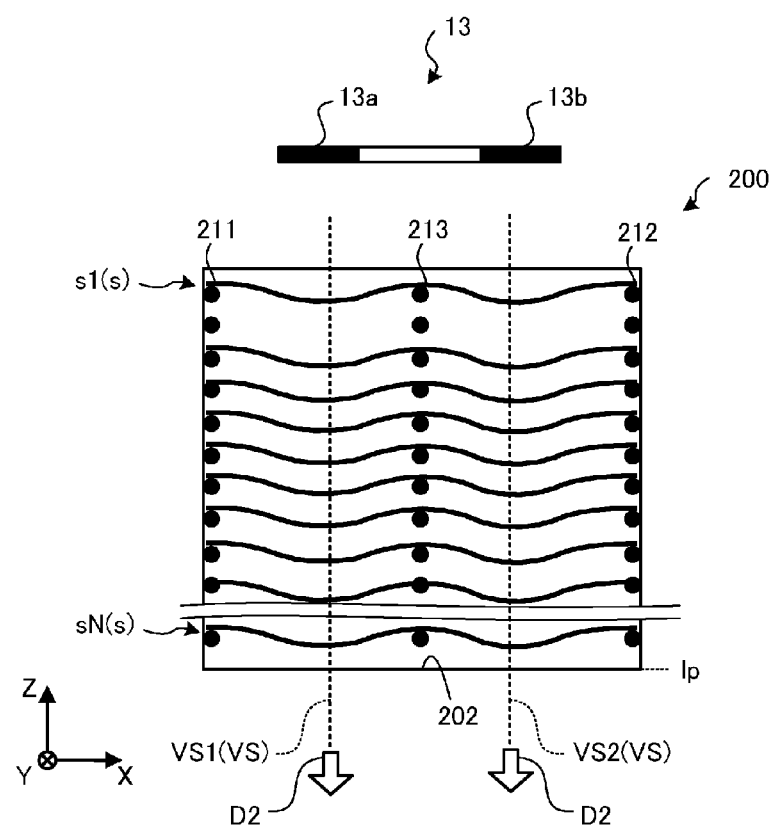
FIG. 5 is an explanatory diagram of a first mapping process when a substrate is unloaded.

Next, the first mapping process when the substrate 500 is unloaded will be described with reference to FIG. 5. FIG. 5 is an explanatory diagram of the mapping process when the substrate 500 is unloaded.

In the first mapping process upon unloading, the controller 20 (see, e.g., FIG. 1) brings the hand 13 closer to the cassette 200 up to a detectable distance d of the sensor S, and positions the hand 13 above the cassette 200, as illustrated in FIG. 5.

The controller 20 then moves down the hand 13. At this time, the controller 20 moves the hand 13 along the Z-axis direction (see arrow D2 in FIG. 5) and causes the sensor S to perform the horizontal scanning along a locus VS. Further, the controller 20 moves the hand 13 until the scanning width of the sensor S reaches at least the bottom side 202 of the cassette 200.

Then, based on the scanning result of the sensor S, the controller 20 detects and records the presence or absence of the substrate 500 in each slot of the cassette 200. When the substrate 500 is missing from any of the slots, the controller 20 performs, for example, an error output.

Further, based on the scanning result of the sensor S, the controller 20 records the height position of the bottom side 202 of the cassette 200 as the lowest position 1p.

(Explanation of Second Mapping Process Upon Unloading)

Figure 6:
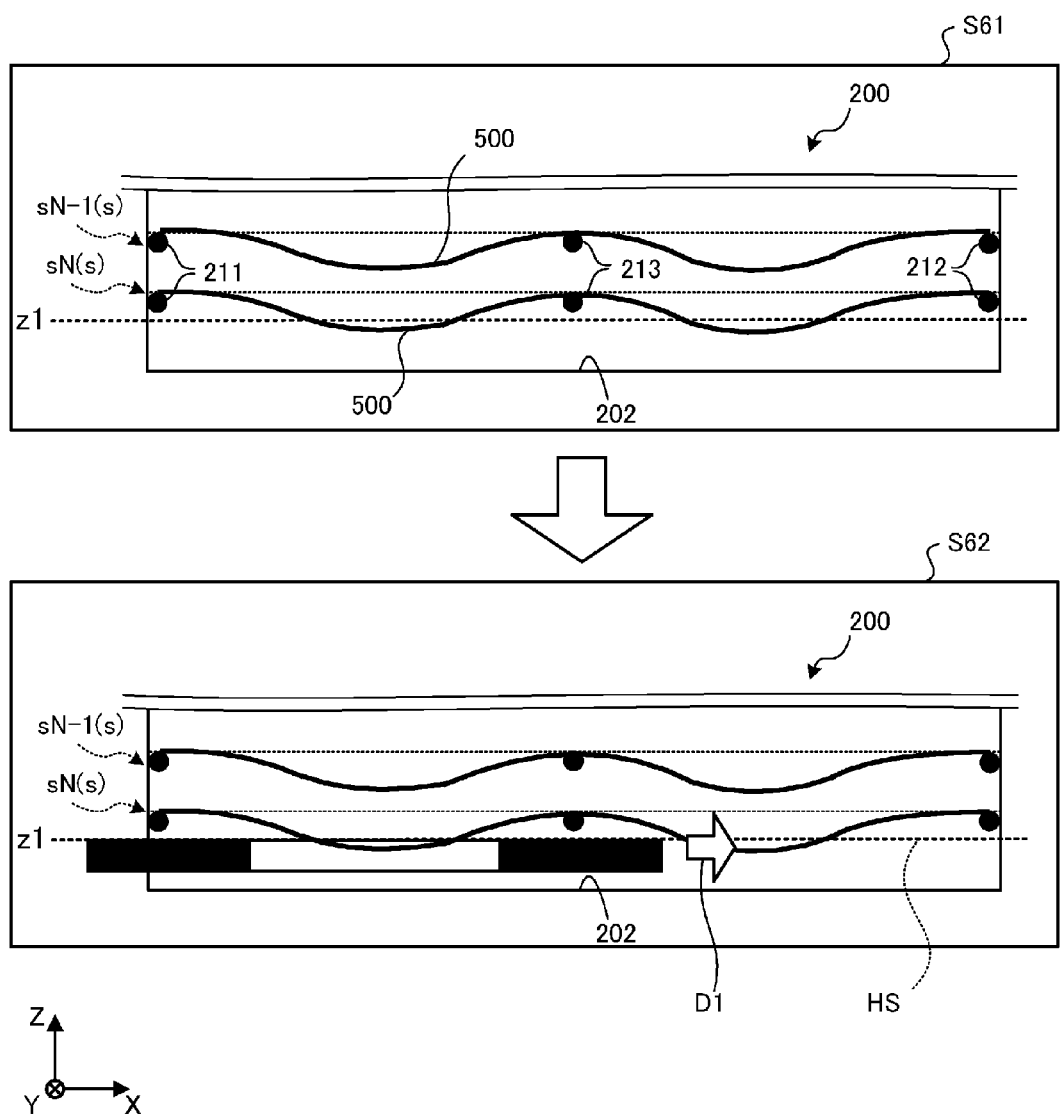
FIG. 6 is an explanatory diagram of a second mapping process when a substrate is unloaded.

Next, referring to FIG. 6, descriptions will be made on the second mapping process, which is a mapping process performed when the cassette 200 is unloaded from the lowest stage after the first mapping process illustrated in FIG. 5. FIG. 6 is an explanatory diagram of the second mapping process when the substrate 500 is unloaded.

In FIG. 6, a flow from a state where the substrates 500 are accommodated up to the lowest-stage slot to a state where the horizontal scanning is performed prior to unloading the lowest-stage substrate 500 is divided into two phases (phases S61 and S62).

As illustrated in phase S61 in FIG. 6, it is assumed that the substrates 500 are accommodated in the cassette 200 up to the lowest-stage slot at the placement height (sN). In addition, it is assumed that each substrate 500 is deformed while being supported by each of the first support portion 211, the second support portion 212, and the third support portion 213.

When the lowest-stage substrate 500 is unloaded from the state, the controller 20 calculates the planned insertion height z1 at the time of unloading from the lowest stage based on the lowest position 1p recorded in the mapping process in FIG. 5, the previously stored pitch P between slots (see, e.g., FIG. 3A), and the thickness of the hand 13.

The controller 20 may calculate the planned insertion height z1 at the time of unloading from the lowest stage by further taking into account a mechanical crossing of the hand 13, a horizontal feeding accuracy, and the like. The planned insertion height z1 corresponds to the lowest position in the cassette 200 where the hand 13 is insertable.

Then, as illustrated in phase S62, the controller 20 controls the operation of the robot 10 to bring the hand 13 closer to the above-described detectable distance d of the sensor S and align the hand 13 with the planned insertion height z1 calculated in phase S61.

Then, the controller 20 horizontally moves the hand 13 (see arrow D1 in FIG. 6) and causes the sensor S to perform the horizontal scanning along the locus HS.

Then, based on the scanning result of the sensor S, the controller 20 determines that the hand 13 is insertable into the cassette 200 at the planned insertion height z1 when no substrate 500 at the placement height (sN) is detected on the locus HS.

Meanwhile, based on the scanning result of the sensor S, the controller 20 determines that the hand 13 is not insertable into the cassette 200 at the planned insertion height z1 when a substrate 500 at the placement height (sN) is detected on the locus HS.

When it is determined that the hand 13 is insertable into the cassette 200 at the planned insertion height z1, the controller 20 inserts the hand 13 at the planned insertion height z1 as planned, and unload the lowest-stage substrate 500 while being held at the placement height (sN) from below.

Meanwhile, when it is determined that the hand 13 is not insertable into the cassette 200 at the planned insertion height z1, the controller 20 performs, for example, an error output, or cancels unloading of the lowest-stage substrate 500 at the planned placement height (sN).

When the substrate 500 is unloaded from a slot above the lowest-stage slot between the placement height s1 and the placement height (sN−1), the controller 20 repeatedly inserts the hand 13 from at least one stage below the unloading target slot, thereby unloading all substrates 500.

(Arrangement Example of Each Device in Transfer Chamber)

Figure 7:
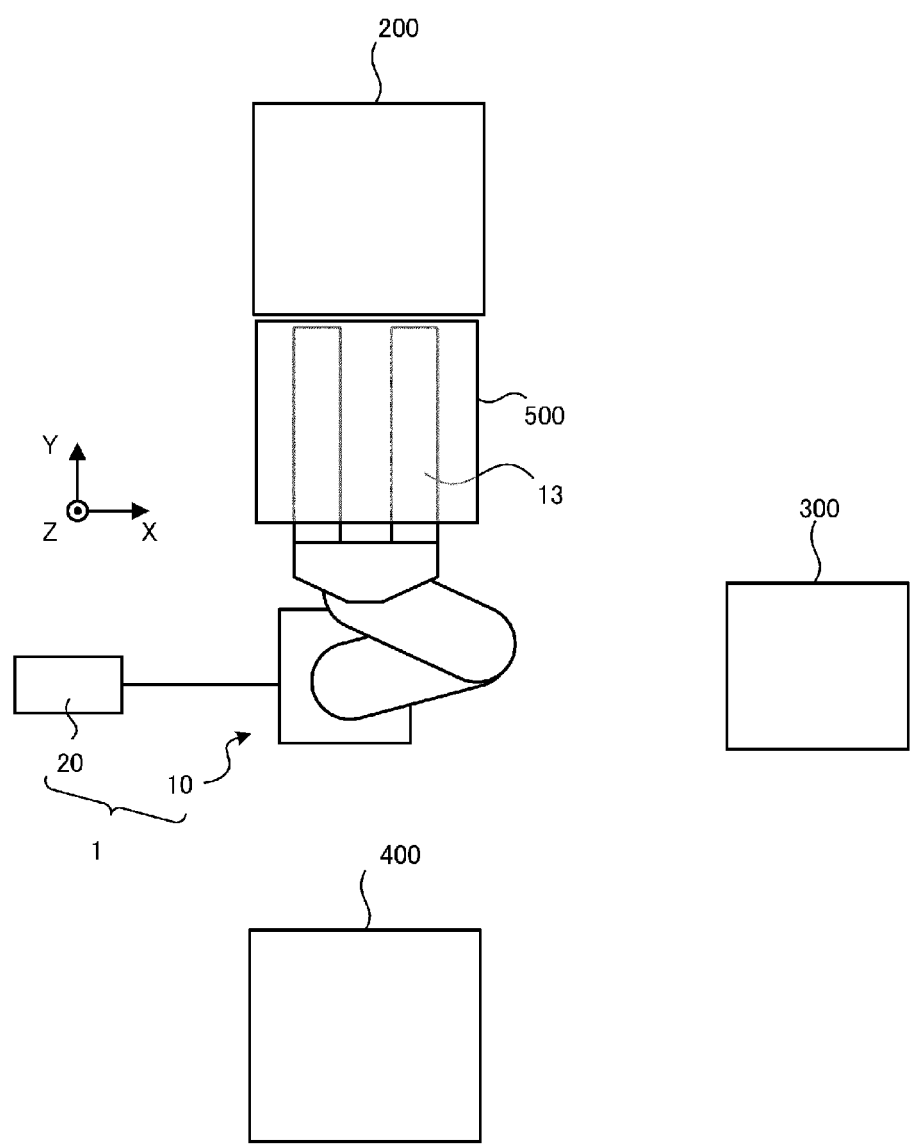
FIG. 7 is a schematic top view illustrating a transfer chamber in which the transfer system is installed.

Next, referring to FIG. 7, descriptions will be made on an arrangement example of each device in a transfer chamber in which the transfer system 1 illustrated in FIG. 1 is installed. FIG. 7 is a schematic top view of a transfer chamber in which the transfer system 1 is installed. As illustrated in FIG. 7, the transfer system 1 including the robot 10 and the controller 20, the cassette 200, an aligner 300, and a processing apparatus 400 are arranged in the transfer chamber.

Here, the transfer chamber is an area surrounded by a housing (not illustrated), and is provided so as to form a clean airflow from the top to the bottom. Further, the aligner 300 has a placing table connected to a rotary shaft that rotates about the vertical Z-axis to align the substrate 500. Further, the processing apparatus 400 is an apparatus that performs various processing treatments on the substrate 500 for each manufacturing process of the substrate 500.

At least the cassette 200 and the aligner 300 are installed within a range accessible by the robot 10. In the embodiment, the robot 10 transfers the substrate 500 from the cassette 200 to the aligner 300, and the substrate 500 is transferred from the aligner 300 to the post-processing apparatus 400 using, for example, another transfer device.

As illustrated in FIG. 7, the processing apparatus 400 may be installed within an accessible range of the robot 10, and the robot 10 may transfer the substrate 500 from the aligner 300 to the processing apparatus 400. In FIG. 7, one cassette 200, one aligner 300, and one processing unit 400 are illustrated, but the number of each device is not limited. That is, two or more devices may be arranged.

As described above, the transfer system 1 detects the deflection of the substrates 500 placed on the cassette 200. However, in a case where the aligner 300 or the processing apparatus 400 accommodates the substrates 500 in multiple stages, the same procedure may be used to detect deflection of substrates 500 placed in the aligner 300 or the processing apparatus 400.

(Configuration Example of Controller)

Figure 8:
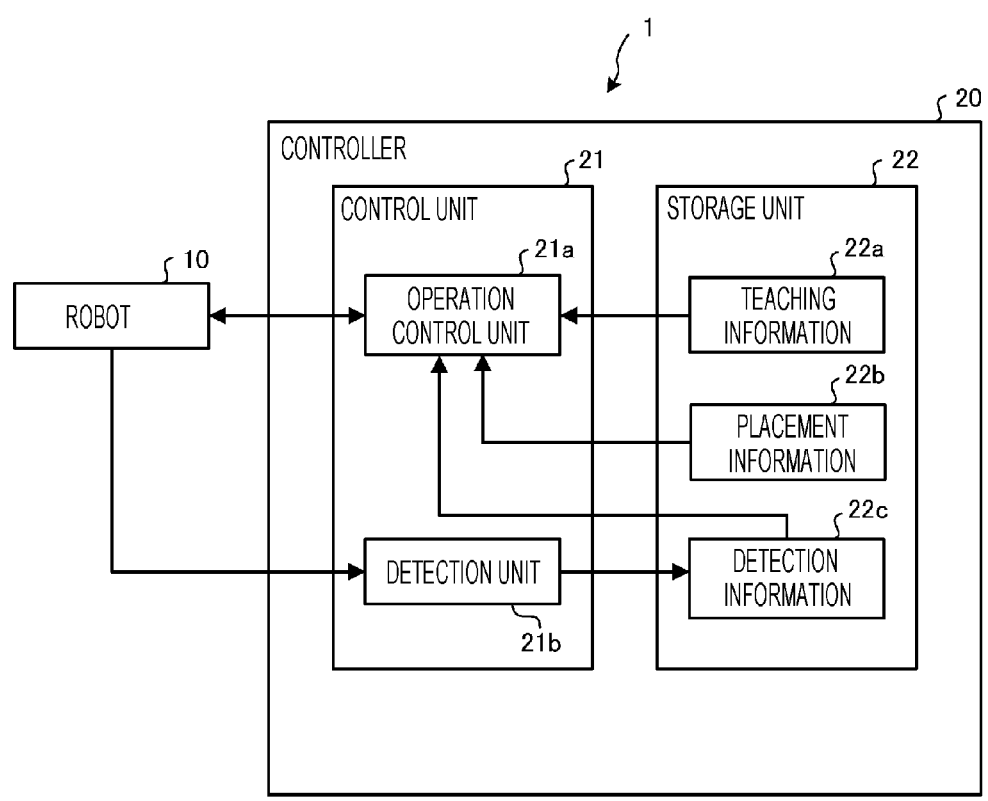
FIG. 8 is a block diagram of the transfer system.

Next, a configuration example of the transfer system 1 illustrated in FIG. 1 will be described with reference to FIG. 8. FIG. 8 is a block diagram of the transfer system 1. The transfer system 1 includes the robot 10 and the controller 20 that controls the operation of the robot 10. Since the configuration example of the robot 10 has already been described with reference to FIG. 2, the configuration of the controller 20 will be mainly described below.

As illustrated in FIG. 8, the controller 20 includes a control unit 21 and a storage unit 22. The control unit 21 includes an operation control unit 21a and a detection unit 21b. The storage unit 22 also stores teaching information 22a, placement information 22b, and detection information 22c. Further, the controller 20 is connected to the robot 10.

Here, the controller 20 includes, for example, a computer having a central processing unit (CPU), a read only memory (ROM), a random access memory (RAM), a hard disk drive (HDD), an input/output port, or various circuits.

The CPU of the computer functions as an operation control unit 21a and a detection unit 21b of the control unit 21 by reading and executing, for example, programs stored in the ROM. Further, at least one or all of the operation control unit 21a and the detection unit 21b of the control unit 21 may be configured by hardware such as an application specific integrated circuit (ASIC) or a field programmable gate array (FPGA).

The storage unit 22 corresponds to, for example, a RAM or an HDD. The RAM and HDD may store the teaching information 22a, the placement information 22b, and the detection information 22c. Further, the controller 20 may acquire the programs described above or various kinds of information via another computer or a portable recording medium connected by a wired or wireless network.

The operation control unit 21a performs operation control of the robot 10 based on the teaching information 22a, the placement information 22b, and the detection information 22c. Specifically, the operation control unit 21a instructs actuators corresponding to the axes of the robot 10 based on the teaching information 22a stored in the storage unit 22, thereby causing the robot 10 to transfer the substrate 500. Further, the operation control unit 21a performs feedback control using encoder values of the actuators, thereby improving the operation accuracy of the robot 10.

Further, the operation control unit 21a controls the operation of the robot 10 that places the substrate 500 at each placement position based on the placement information 22b including the placement height at the placement position of the substrate 500. At this time, the operation control unit 21a calculates the planned insertion height z1 based on the detection information 22c and the placement information 22b recorded by the detection unit 21b.

Further, the operation control unit 21a determines whether the hand 13 is insertable at the planned insertion height z1 based on the calculated planned insertion height z1 and the detection information 22c. Further, when the hand 13 is insertable, the operation control unit 21a transfers the substrate 500 as planned. Further, when the hand 13 is not insertable, the operation control unit 21a outputs an error or stops the transfer.

Based on the scanning result of the sensor S, the detection unit 21b records, in the detection information 22c, the presence or absence of the substrate 500 in each slot, the lowest position 1p, the presence or absence of the substrate 500 in the locus HS, and the position when the substrate 500 is detected.

The teaching information 22a is information generated in the teaching step of teaching the robot 10 to perform operations, and including "jobs" that define the operations of the robot 10 including the movement locus of the hand 13. The teaching information 22a generated by another computer connected by a wired or wireless network may be stored in the storage unit 22.

The placement information 22b is information including the placement height of the substrate 500 on each stage of the cassette 200, the pitch P between slots, and the thickness of the hand 13. Further, the placement information 22b may include the geometrical tolerance of the hand 13, the horizontal feed accuracy, and the amount of deflection of the substrate 500 held by the hand 13, which are taken into account when calculating the planned insertion height z1.

The detection information 22c is information including the presence or absence of the substrate 500 in each slot, the lowest position 1p, the presence or absence of the substrate 500 in the locus HS, and the position when the substrate 500 is detected, which are recorded by the detection unit 21b based on the scanning result of the sensor S.

(Processing Procedure of Loading Process)

Next, each processing procedure of the loading process and the unloading process executed by the transfer system 1 will be described with reference to FIGS. 9 to 11.

The loading process will be first described. FIG. 9 is a flow chart illustrating the processing procedure of the loading process. FIG. 9 illustrates the processing procedure of a case where the substrate 500 is to be loaded into the (n+1)-th stage in the current loading process following the previous loading process in which the substrate 500 was loaded into the n-th stage (n is a natural number) of the cassette 200.

Figure 9:
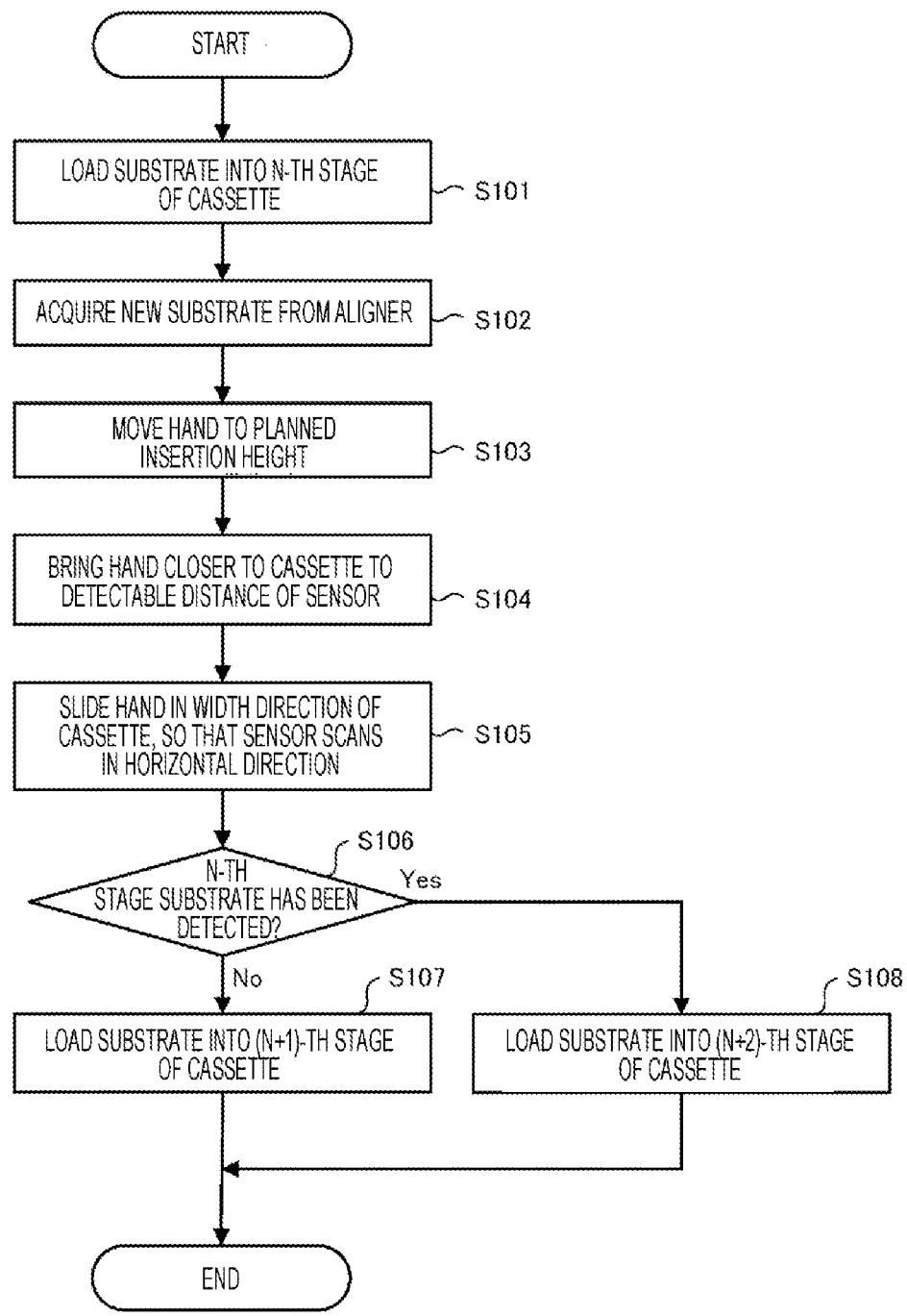
FIG. 9 is a flow chart illustrating the processing procedure of a loading process.

As illustrated in FIG. 9, first, it is assumed that the robot 10 has loaded the substrate 500 into the n-th stage of the cassette 200 in the previous loading process based on the control of the operation control unit 21a of the controller 20 (see, e.g., FIG. 8) (step S101).

Then, the operation control unit 21a causes the robot 10 to acquire a new substrate 500 from the aligner 300 for the current loading process (step S102). Then, the operation control unit 21a calculates a planned insertion height z1 of the (n+1)-th stage of the cassette 200, and causes the robot 10 to move the hand 13 to the planned insertion height z1 (step S103).

Subsequently, the operation control unit 21a causes the robot 10 to bring the hand 13 closer to the cassette 200 to the detectable distance of the sensor S (step S104). Then, the operation control unit 21a causes the robot 10 to slide the hand 13 in the width direction of the cassette 200, so that the sensor S scans in the horizontal direction (step S105).

Then, based on the scanning result of the sensor S, the detection unit 21b of the controller 20 determines whether the n-th stage substrate 500 has been detected (step S106).

Here, when the n-th stage substrate 500 is not detected (step S106, No), the operation control unit 21a causes the robot 10 to load a substrate 500 into the (n+1)-th stage of the cassette 200 (step S107), and ends the process.

Meanwhile, when the n-th stage substrate 500 is not detected (step S106, Yes), the operation control unit 21a causes the robot 10 to load a substrate 500 into, for example, the (n+2)-th stage of the cassette 200 (step S108), and ends the process.

(Processing Procedure of Unloading Process)

Next, the unloading process will be described. FIG. 10 is a flowchart (part 1) illustrating the processing procedure of the unloading process. Further, FIG. 11 is a flowchart (part 2) illustrating the processing procedure of the unloading process. The processing procedure of FIG. 10 corresponds to the processing procedure of the first mapping process when the substrate 500 is unloaded as described using FIG. 5.

Figure 10:
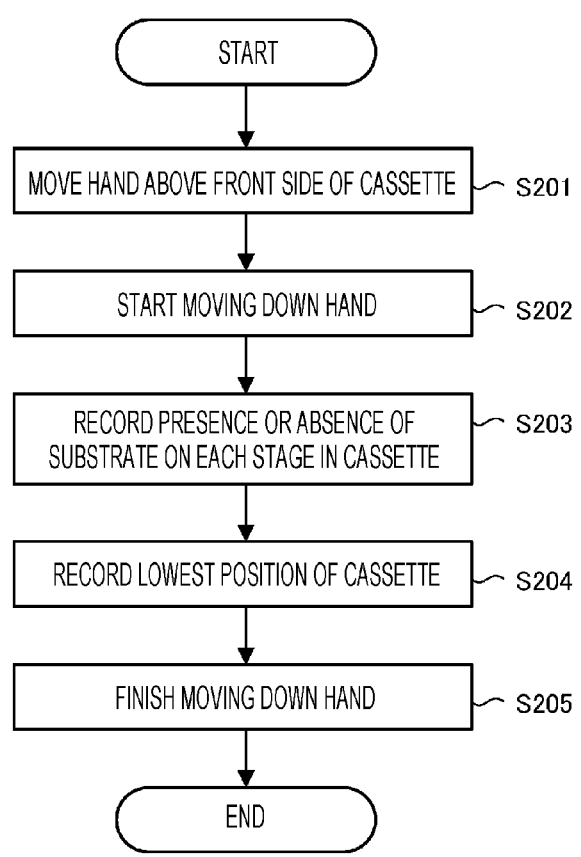
FIG. 10 is a flowchart (part 1) illustrating the processing procedure of an unloading process.

In the first mapping process when the substrate 500 is unloaded, the operation control unit 21a of the controller 20 causes the robot 10 to move the hand 13 above the front side 204 of the cassette 200, as illustrated in FIG. 10 (step S201).

Then, the operation control unit 21a causes the robot 10 to start moving down the hand 13 (step S202). Along with the moving down, the sensor S scans in the vertical direction, and the detection unit 21b of the controller 20 records the presence or absence of the substrates 500 on each stage in the cassette 200 based on the scanning result of the sensor S (step S203).

Further, the detection unit 21b records the lowest position 1p (see, e.g., FIG. 3A) of the cassette 200 based on the scanning result of the sensor S (step S204). Then, the operation control unit 21a causes the robot 10 to finish moving down the hand 13 (step S205), and ends the first mapping process when the substrate 500 is unloaded.

Figure 11:
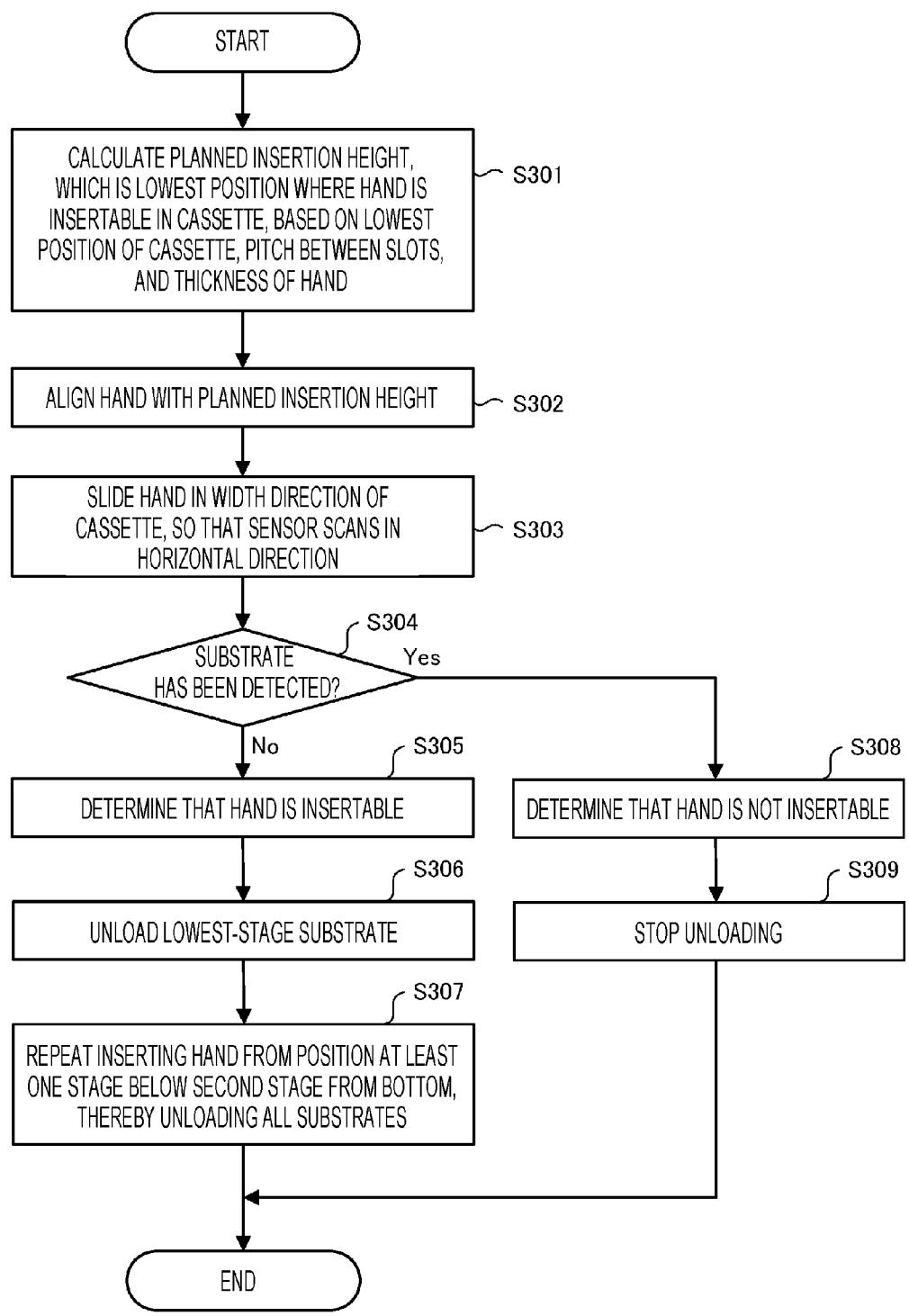
FIG. 11 is a flowchart (part 2) illustrating the processing procedure of the unloading process.

Following this first mapping process, as illustrated in FIG. 11, the operation control unit 21a of the controller 20 calculates the planned insertion height z1, which is the lowest position where the hand 13 is insertable in the cassette 200, based on the lowest position 1p of cassette 200, the pitch P between slots (both see, e.g., FIG. 3A), and the thickness of hand 13 (step S301).

Then, the operation control unit 21a controls the operation of the robot 10 to align the hand 13 with the planned insertion height z1 (step S302). Then, the operation control unit 21a causes the robot 10 to slide the hand 13 in the width direction of the cassette 200, so that the sensor S scans in the horizontal direction (step S303).

Then, based on the scanning result of the sensor S, the detection unit 21b of the controller 20 determines whether the stage substrate 500 has been detected at the planned insertion height z1 described above (step S304).

Here, when no substrate 500 is detected (step S304, No), the operation control unit 21a determines that the hand 13 is insertable at the planned insertion height z1 (step S305). Then, the operation control unit 21a causes the robot 10 to insert the hand 13 and unload the lowest-stage substrate 500 (step S306).

The operation control unit 21a repeats inserting the hand 13 from a position at least one stage below the second stage from the bottom, thereby unloading all the substrates 500 (step S307), and ends the process.

Meanwhile, when the substrate 500 is detected (step S304, Yes), the operation control unit 21a determines that the hand 13 is not insertable at the planned insertion height z1 (step S308). Then, the operation control unit 21a stops unloading (step S309) and ends the process.

(Modification of Scanning Width of Sensor)

Figure 12:
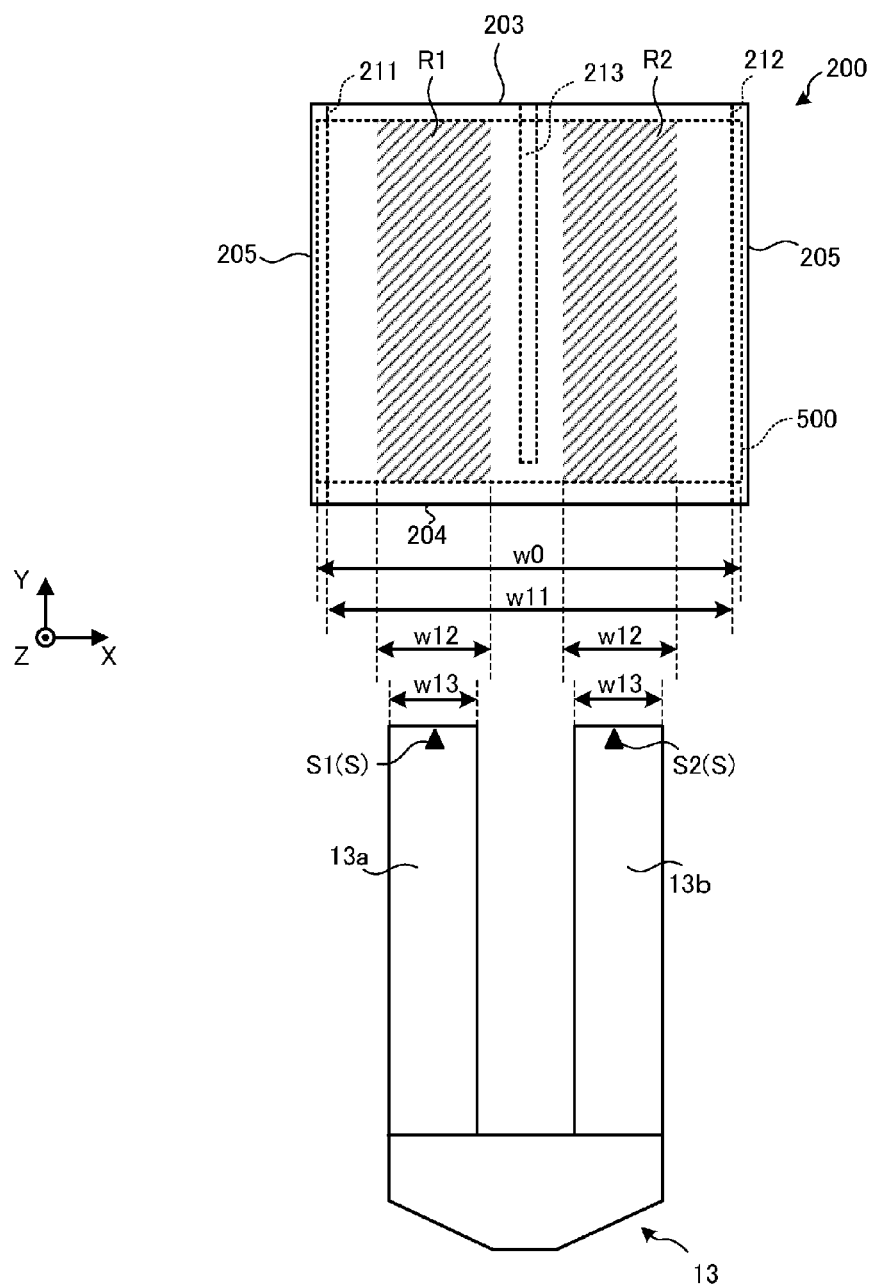
FIG. 12 is a view illustrating a modification of a scanning width of a sensor.

Although descriptions have been made on the case where the scanning width of the sensor S is a width wO from one end to the other end of the substrate 500 in the width direction of the cassette 200, the scanning width of the sensor S is not limited thereto. A modification of the scanning width of the sensor S will be described with reference to FIG. 12. FIG. 12 is a view illustrating a modification of the scanning width of the sensor S.

As illustrated in FIG. 12, first, the width w0 is a case where the scanning width of the sensor S exemplified above is the full width of the substrate 500. By setting the width w0 as the scanning width of the horizontal scanning of the sensor S, the controller 20 may detect the possibility of contact with higher accuracy.

Meanwhile, the controller 20 may cause the sensor S to perform the horizontal scanning such that the scanning width of the sensor S is equal to a width w11 that is a distance between the first support portion 211 and the second support portion 212, which are the supports at both ends of cassette 200. Thus, the possibility of contact between the substrate 500 and the hand 13 due to the deflection of the substrate 500 may be detected with high accuracy.

Further, the controller 20 may cause the sensor S to perform the horizontal scanning such that the scanning width of the sensor S is equal to a width w12 that is a width of an inspection regions R1 and R2 preset between the adjacent first and third support portion 211 and 213 or between the adjacent second and third support portions 212 and 213.

The inspection regions R1 and R2 are regions on the substrate 500 where deflection is likely to occur, which are set in advance based on experiments and actual operational data. The controller 20 moves the hand 13 to the left and right so as to perform the horizontal scanning on the inspection region R1 with the sensor S1 and on the inspection region R2 with the sensor S2, respectively, with the width w12.

As a result, the horizontal scanning may be efficiently performed on the region where the substrate 500 is likely to be deflected.

Further, the controller 20 may cause the sensor S to perform the horizontal scanning such that the scanning width of the sensor S is equal to a width w13 that is a width of each of the first and second extending portions 13a and 13b of the hand 13. In this case, the controller 20 moves the hand 13 to the left and right so as to perform the horizontal scanning on the first extending portion 13a with the sensor S1 and on the second extending portion 13b with the sensor S2, respectively, with the width w13.

As a result, the horizontal scanning may be efficiently performed with respect to the width w13 of the first extending portion 13a and the second extending portion 13b, which are obviously likely to come into contact with the substrate 500.

SUMMARY

As described above, the transfer system 1 according to one aspect of the embodiment includes a robot 10 that loads and unloads substrates 500 to and from a cassette 200 that accommodates the substrates 500 in multiple stages, and a controller 20 that controls an operation of the robot 10. The robot 10 includes a hand 13 that transfers the substrate 500, a horizontal movement mechanism that moves the hand 13 in a width direction in a front side 204 of the cassette 200, and a lift mechanism that moves up and down the hand 13.

The hand 13 includes a sensor S that detects an object on a distal end side facing the cassette 200. The controller 20 operates the horizontal movement mechanism causing the sensor S to perform horizontal scanning such that the sensor S facing the substrate 500 accommodated in the cassette 200 scans in the width direction of the substrate 500.

Thus, by operating the horizontal movement mechanism such that the sensor S scans in the width direction of the substrate 500 that has been accommodated in the cassette 200, it is possible to detect the possibility of contact between the substrate 500 and the hand 13 due to the deflection of the substrate 500. Therefore, it is possible to acquire the possibility of contact between the substrate 500 and the hand 13 even when the substrate 500 is significantly deflected, thereby preventing damage to the substrate 500 due to contact.

Further, the hand 13 includes one or more extending portions that have the sensor S disposed on the distal end side and support the substrate 500 from below. The controller 20 causes the horizontal scanning to be performed such that the scanning width of the horizontal scanning is equal to the width w13 of the extending portion. Thus, the horizontal scanning may be performed efficiently.

Further, the cassette 200 includes a plurality of support portions that support the substrate 500 at a plurality of locations, respectively, in each stage when viewed from the front side 204. The controller 20 causes the horizontal scanning to be performed such that the scanning width is equal to a width of inspection regions R1 and R2 preset between adjacent support portions. Therefore, the horizontal scanning may be efficiently performed by making the inspection regions R1 and R2 prone to deflection.

Further, the cassette 200 includes a plurality of support portions that support the substrate 500 at a plurality of locations in each stage when viewed from the front side 204. the controller 20 causes the horizontal scanning to be performed such that the scanning width is equal to a distance between the support portions at both ends. Thus, the possibility of contact between the substrate 500 and the hand 13 due to the deflection of the substrate 500 may be detected with high accuracy.

Further, the controller 20 causes the horizontal scanning to be performed such that the scanning width is equal to a full width of the substrate 500. Thus, the possibility of contact may be detected with higher accuracy.

Further, the hand 13 has a width smaller than a width w0 of the substrate 500, and the sensor S includes at least two sensors S1 and S2 disposed on the extending portions on both ends of the hand 13, respectively. The controller 20 causes the horizontal scanning to be performed such that the hand 13 moves from a start position where the sensor S1 faces one end of the substrate 500 and the sensor S2 faces a range where the substrate 500 exists (e.g., a position between the one end and the other end of the substrate), to an end position where the sensor S1 reaches a position of the sensor S2 at the start position and the sensor S2 reaches the other end (e.g., the remaining end) of the substrate 500. Thus, detection may be performed across the entire width of the substrate 500 while suppressing the amount of movement in the width direction.

Further, when the substrate 500 is loaded to the cassette 200, the robot 10 performs the loading in an order from a top of the cassette 200 to a bottom of the cassette 200, and loads a new substrate 500 after the horizontal scanning is performed on a substrate 500 that has been loaded in a stage immediately above a stage where the new substrate 500 is loaded. Thus, the throughput of the loading process may be increased by loading the substrates 500 in the order from the top to the bottom of the cassette 200. Further, by performing the horizontal scanning on the substrate 500 on the immediately-above stage, the possibility of contact during loading of the substrate 500 may be more reliably determined even when the deflection increases due to the passage of time after loading.

Further, while holding the new substrate 500, the robot 10 performs the horizontal scanning on the substrate 500 that has been loaded to the immediately-above stage. Thus, by performing the horizontal scanning on the substrate 500 that has been loaded to the immediately-above stage while the next substrate 500 to be loaded is held by the hands 13, the throughput of the loading process may be increased as compared with the case where the substrate 500 is held by the hands 13 after the horizontal scanning is performed before holding the substrate 500.

Further, the cassette 200 includes a plurality of support portions that support the substrate 500 at a plurality of locations in each stage when viewed from the front side 204. Further, when a bar-shaped support portion that is sandwiched between the support portions at both ends of the cassette 200 and extends from a rear side 203 of the cassette 200 to the front side 204 of the cassette is shorter than a depth of the substrate 500, the robot 10 loads a new substrate 500 after the horizontal scanning is performed on the substrate 500 that has been loaded to the immediately-above stage such that the scanning width of the horizontal scanning is equal to the distance between the support portions at both ends. Thus, when the bar-shaped support portion is short, the front side 204 of the substrate 500 may droop forward, but such drooping may also be detected by setting the width of horizontal scanning as the distance between the support portions at both ends in the cassette 200.

Further, the hand 13 includes one or more extending portions that have the sensor S disposed on the distal end side and support the substrate 500 from below. When the substrate 500 is unloaded from the cassette 200, the robot 10 performs the unloading in an order from the bottom of the cassette 200 to the top of the cassette 200, performs the horizontal scanning on a region corresponding to a width of the extending portions of the hand on a substrate 500 to be unloaded, and unloads the substrate 500 by advancing the extending portions below the substrate 500 on a condition that the substrate 500 is not detected. Thus, in the unloading process, the horizontal scanning is performed only in a range where there is a possibility of contact with the extending portions of the hand 13, so that the substrate 500 may be efficiently unloaded while preventing contact with the substrate 500.

Further, when a substrate 500 accommodated in the lowest stage of the cassette 200 is unloaded, the robot 10 performs the horizontal scanning on the substrate 500 at a planned insertion height z1 calculated based on a height of a bottom side of the cassette 200 acquired in advance, and unloads the substrate 500 by advancing the extending portions below the substrate 500 at the planned insertion height on the condition that the substrate 500 is not detected. Thus, the substrate 500 on the lowest stage may be unloaded while preventing contact with the substrate 500 on the lowest stage and the body of the cassette 200.

Further, when a substrate 500 accommodated in each stage of the cassette except for the lowest stage is unloaded, the robot 10 omits the horizontal scanning of the substrate 500, and the robot 10 moves the hand 13, which has been moved down to at least an accommodation position of a substrate 500 unloaded immediately before, into the cassette 200, and moves up the hand 13, thereby unloading the substrate 500 to be unloaded while the substrate 500 is placed on the hand. Thus, the throughput of the unloading process may be increased by omitting the horizontal scanning except for the lowest stage of the cassette 200. Further, since the next substrate 500 is unloaded by moving the hand 13 into the accommodation position of the substrate 500 that has been unloaded immediately before and then moving up the substrate 500, contact between the hand 13 and the substrate 500 may be prevented even without detecting deflection by the horizontal scanning.

Further, the hand 13 includes one or more extending portions that have the sensor S disposed on the distal end side and support the substrate 500 from below. When the substrate 500 is loaded to the cassette 200, the robot 10 performs the loading in an order from a top of the cassette 200 to a bottom of the cassette 200, and loads a new substrate 500 after the horizontal scanning is performed on a substrate 500 that has been loaded in a stage immediately above a stage where the new substrate 500 is loaded. When the substrate 500 is unloaded from the cassette 200, the robot 10 performs the unloading in an order from the bottom of the cassette 200 to the top of the cassette 200, performs the horizontal scanning on a region corresponding to a width of the extending portions of the hand 13 on a substrate 500 to be unloaded, and unloads the substrate 500 by advancing the extending portions below the substrate 500 on a condition that the substrate 500 is not detected. Thus, in the case of loading, the loading is performed after the horizontal scanning is performed on the substrate 500 immediately above, and in the case of unloading, the horizontal scanning is performed only in the range where there is a possibility of contact with the extending portions of the hand 13 is performed, so that the substrate may be efficiently transferred while preventing the contact.

Further, the horizontal movement mechanism is a horizontally articulated SCARA arm. Thus, the horizontal movement mechanism may be implemented in a space-saving manner.

In the above-described embodiment, the horizontal movement mechanism is a horizontally articulated SCARA arm, but the configuration of the horizontal movement mechanism is not limited thereto. For example, the horizontal movement mechanism may be implemented by a combination of a robot with fewer axes than the robot 10 illustrated in FIG. 2 and a traveling mechanism that moves the body of the robot along the width direction (X-axis direction) of the front side 204 of the cassette 200.

According to an aspect of an embodiment, it is possible to provide a transfer system and a transfer method capable of preventing substrates from being damaged due to contact even when the substrates are significantly deflected.

From the foregoing, it will be appreciated that various embodiments of the present disclosure have been described herein for purposes of illustration, and that various Modifications may be made without departing from the scope and spirit of the present disclosure. Accordingly, the various embodiments disclosed herein are not intended to be limiting, with the true scope and spirit being indicated by the following claims.

What is claimed is:

1. A transfer system comprising:
   a robot configured to load and unload a substrate to and from a cassette that accommodates a plurality of substrates in multiple stages; and
   a controller configured to control an operation of the robot, wherein the robot includes:
a hand configured to transfer the substrate;
a horizontal arm configured to move the hand in a width direction of the cassette in a front side of the cassette; and
a lift configured to move up and down the hand,
wherein the hand includes a reflective sensor on a distal end side thereof facing the cassette to detect an object in the cassette, and
wherein the controller operates the horizontal arm causing the reflective sensor to perform a horizontal scanning at a height where the hand enters below the substrate such that the reflective sensor facing the substrate accommodated in the cassette scans in the width direction of the substrate.

2. The transfer system according to claim 1, wherein the hand further includes one or more extensions each equipped with the reflective sensor disposed on a distal end side thereof and configured to support the substrate from below, and
the controller causes the horizontal scanning to be performed such that the scanning width of the horizontal scanning is substantially equal to a width of the extensions.

3. The transfer system according to claim 2, wherein the cassette includes a plurality of supports that support the substrate at a plurality of locations, respectively, in each stage when viewed from the front side, and
the controller causes the horizontal scanning to be performed such that the scanning width is substantially equal to a width of an inspection region preset between adjacent supports.

4. The transfer system according to claim 2, wherein the cassette includes a plurality of supports that support the substrate at a plurality of locations in each stage when viewed from the front side, and
the controller causes the horizontal scanning to be performed such that the scanning width is substantially equal to a distance between the supports at both ends.

5. The transfer system according to claim 2, wherein the controller causes the horizontal scanning to be performed such that the scanning width is substantially equal to a full width of the substrate.

6. The transfer system according to claim 2, wherein the hand has a width smaller than a width of the substrate,
the reflective sensor includes at least first and second sensors disposed on the extensions on both ends of the hand, respectively, and
the controller causes the horizontal scanning to be performed such that the hand moves from a start position where the first sensor faces one end of the substrate and the second sensor faces a range where the substrate exists, to an end position where the first sensor reaches a position of the second sensor at the start position and the second sensor reaches a remaining end of the substrate.

7. The transfer system according to claim 1, wherein when the substrate is loaded to the cassette, the robot performs the loading in an order from a top of the cassette to a bottom of the cassette, and loads a new substrate after the horizontal scanning is performed on a substrate that has been loaded in a stage immediately above a stage where the new substrate is loaded.

8. The transfer system according to claim 7, whether while holding the new substrate, the robot performs the horizontal scanning on the substrate that has been loaded to the immediately-above stage.

9. The transfer system according to claim 8, wherein the cassette includes a plurality of supports that support the substrate at a plurality of locations in each stage when viewed from the front side, and
when a bar-shaped support that is sandwiched between the supports at both ends of the cassette and extends from a rear side of the cassette to the front side of the cassette is shorter than a depth of the substrate, the robot loads a new substrate after the horizontal scanning is performed on the substrate that has been loaded to the immediately-above stage such that the scanning width of the horizontal scanning is substantially equal to the distance between the supports at both ends.

10. The transfer system according to claim 9, wherein the hand further includes one or more extensions each equipped with the reflective sensor disposed on the distal end side thereof and configured to support the substrate from below, and
when the substrate is unloaded from the cassette, the robot performs the unloading in an order from the bottom of the cassette to the top of the cassette, performs the horizontal scanning on a region corresponding to a width of the extensions of the hand on a substrate to be unloaded, and unloads the substrate by advancing the extensions below the substrate when no other substrate is detected below the substrate to be unloaded.

11. The transfer system according to claim 10, wherein when a substrate accommodated in the lowest stage of the cassette is unloaded, the robot performs the horizontal scanning on the substrate at an advancing height calculated based on a height of the bottom of the cassette acquired in advance, and unloads the substrate by advancing the extensions below the substrate at the advancing height when no other substrate is detected below the substrate to be unloaded.

12. The transfer system according to claim 10, wherein when a substrate accommodated in each stage of the cassette except for the lowest stage is unloaded, the robot omits the horizontal scanning of the substrate, moves the hand, which has been moved down to at least an accommodation position of a substrate unloaded immediately before, into the cassette, and moves up the hand, thereby unloading the substrate to be unloaded while the substrate is placed on the hand.

13. The transfer system according to claim 1, wherein the hand further includes one or more extensions each equipped with the reflective sensor disposed on the distal end side thereof and configured to support the substrate from below,
when the substrate is loaded to the cassette, the robot performs the loading in an order from a top of the cassette to a bottom of the cassette, and loads a new substrate after the horizontal scanning is performed on a substrate that has been loaded to a stage immediately above a stage where the new substrate is loaded, and
when the substrate is unloaded from the cassette, the robot performs the unloading in an order from the bottom of the cassette to the top of the cassette, performs the horizontal scanning on a region corresponding to a width of the extensions of the hand on a substrate to be unloaded, and unloads the substrate by advancing the extensions below the substrate when no other substrate is detected below the substrate to be unloaded.

14. The transfer system according to claim 1, wherein the horizontal arm is a horizontally articulated Selective Compliance Assembly Robot Arm (SCARA).

15. A transfer method comprising:
providing a transfer system including a robot configured to load and unload a substrate to and from a cassette that accommodates a plurality of substrates in multiple stages; and a controller configured to control an operation of the robot, the robot including a hand configured to transfer the substrate, a horizontal arm configured to move the hand in a width direction in a front side of the cassette, and a lift configured to move up and down the hand, and the hand including a reflective sensor configured to detect an object on a distal end side facing the cassette; and
operating the horizontal arm causing the reflective sensor to perform a horizontal scanning at a height where the hand enters below the substrate such that the reflective sensor facing the substrate scans in the width direction of the substrate accommodated in the cassette.

* * * * *